United States Patent
Sakaki et al.

[11] Patent Number: 5,870,648
[45] Date of Patent: *Feb. 9, 1999

[54] IMAGE FORMING APPARATUS AND METHOD USING A TRANSFER MEMBER FOR CARRYING A PLURALITY OF SHEETS

[75] Inventors: Eihiro Sakaki, Chofu; Tohru Kosaka, Machida, both of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 569,059

[22] Filed: Dec. 8, 1995

[30] Foreign Application Priority Data

Dec. 15, 1994 [JP] Japan ................................ 6-311795

[51] Int. Cl.⁶ .................................................. G03G 15/16
[52] U.S. Cl. ............................ 399/66; 399/303; 358/300
[58] Field of Search .............................. 399/303, 66, 304, 399/305, 312, 43, 45, 8; 347/115, 116, 232; 358/300

[56] References Cited

U.S. PATENT DOCUMENTS 4,712,906  12/1987  Bothner et al. ......................... 399/303
5,006,900  4/1991   Baughman et al. ..................... 399/305
5,070,369  12/1991  Mahoney et al. .
5,249,021  9/1993   Hasegawa et al. .
5,333,057  7/1994   Morikawa et al. ..................... 359/296
5,335,056  8/1994   Muramatsu .
5,383,012  1/1995   Yamada .
5,481,365  1/1996   Arimoto ................................. 358/300
5,636,010  6/1997   Danzuka et al. ....................... 399/300
5,673,115  9/1997   Arimoto ................................. 358/300
5,689,790  11/1997  Kubo et al. ............................ 399/343

FOREIGN PATENT DOCUMENTS

88/05563   7/1988   European Pat. Off. .
492579     7/1992   European Pat. Off. .
91/14209   9/1991   WIPO .

Primary Examiner—Robert Beatty
Attorney, Agent, or Firm—Fitzpatrick, Cella, Harper & Scinto

[57] ABSTRACT

An electrographic recording apparatus having a memory for storing first and second images having different sizes and using an intermediate transfer member compares sizes of the input images of first page and second page with a size of a transfer area of the intermediate transfer member, and when a sum of the sizes of the images of the first page and the second page is less than the size of the transfer area, controls image forming means to transfer developed images of the first page and the second page to the intermediate transfer member in one process to reduce a time required for recording in a multiple sheet image recording mode.

13 Claims, 10 Drawing Sheets

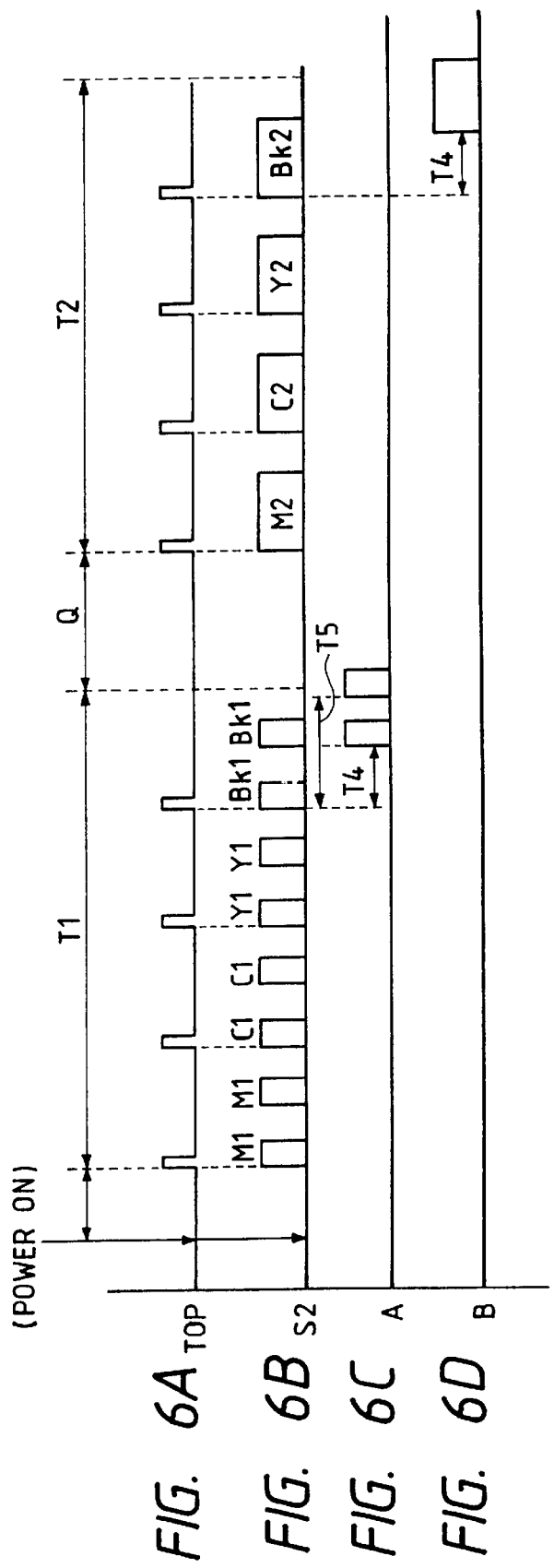

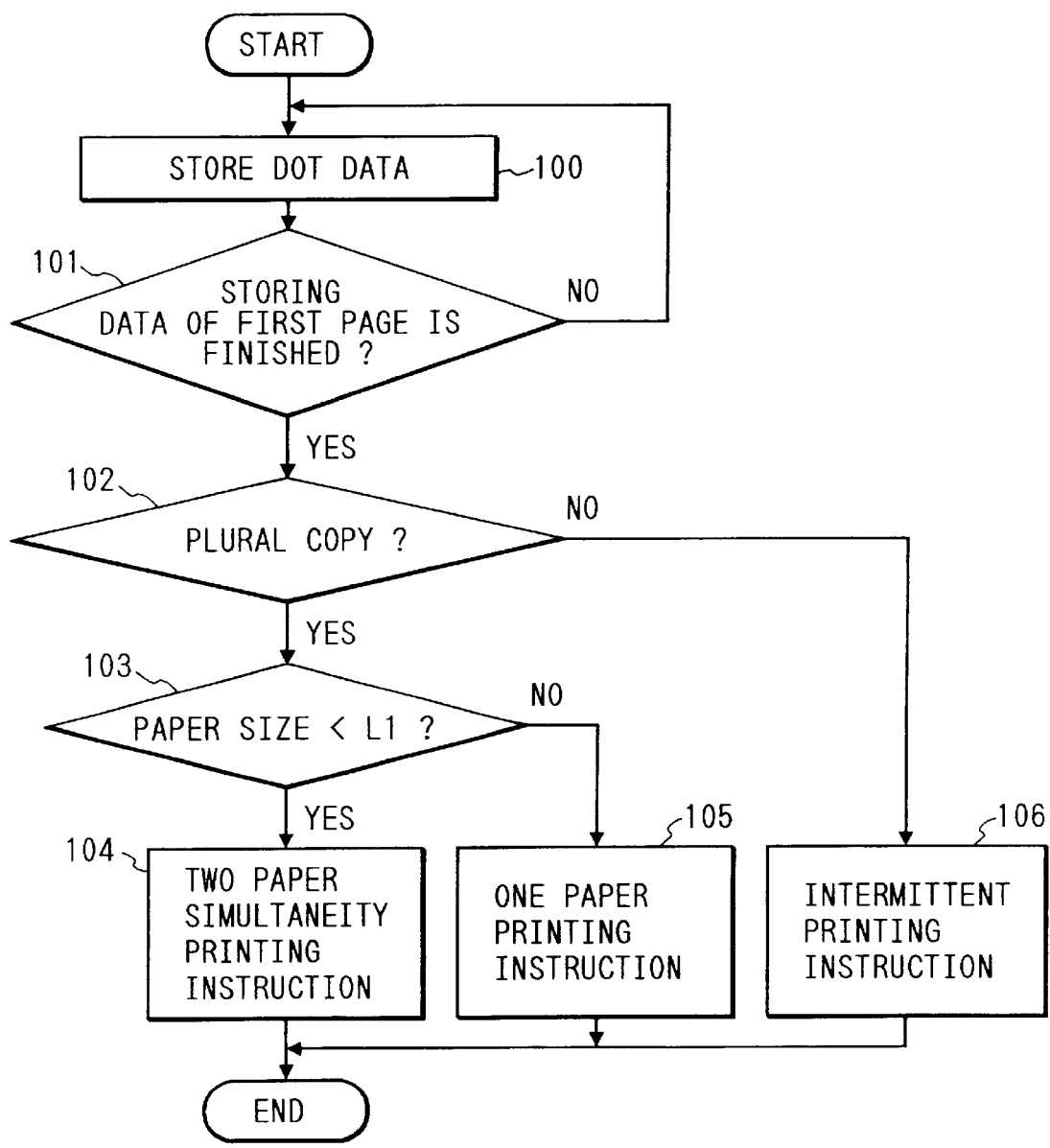

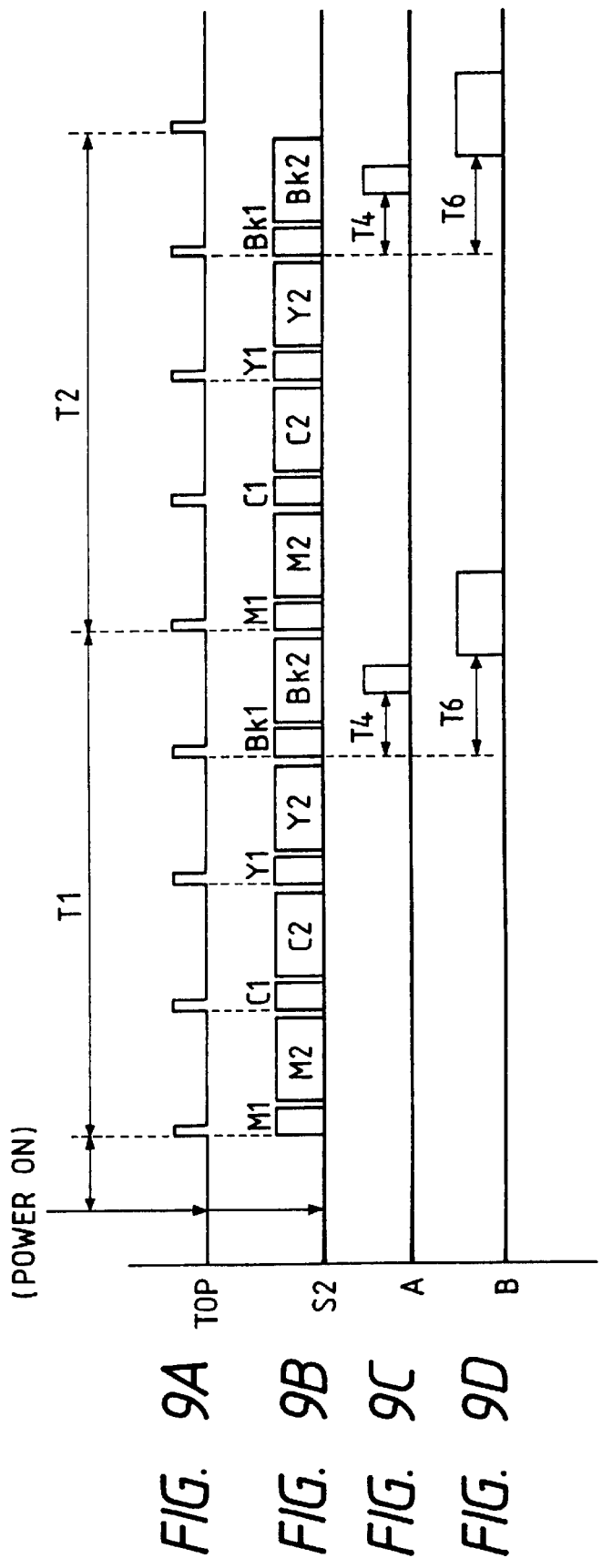

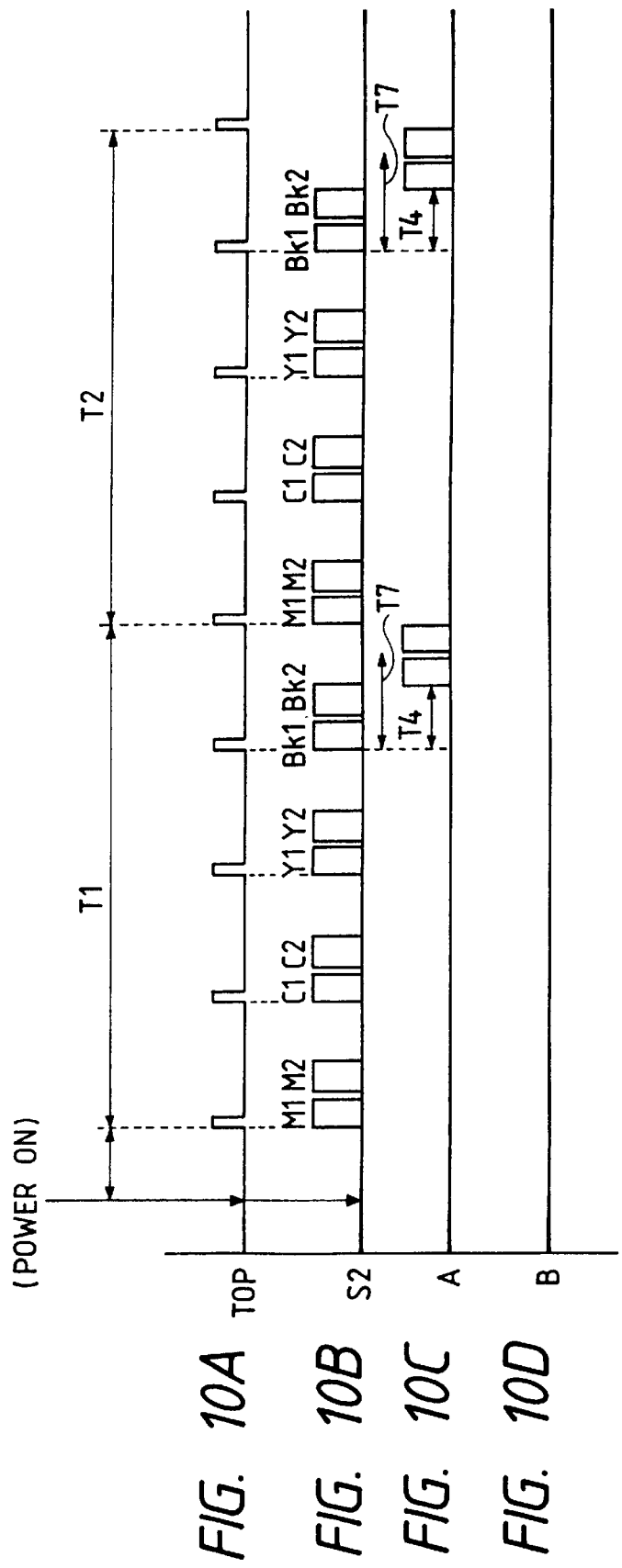

IMAGE FORMING APPARATUS AND METHOD USING A TRANSFER MEMBER FOR CARRYING A PLURALITY OF SHEETS

BACKGROUND OF THE INVENTION

1. Field of the Invention

The present invention relates to a color image forming apparatus and a color image forming method in the color image forming apparatus.

2. Related Background Art

Recently, a printer has become colorized and used for presentations by users in various ways. Particularly, a color page printer is attracting interest because of its low noise, high print quality and high print speed. A color laser printer which is one of such color printers is explained below.

The color laser beam printer is characterized by a first step of forming a latent image of a first color component by scanning a light beam on a photo-conductive medium in a main scan direction to conduct first development and then transferring it on a carrier such as a transfer drum, followed by second, third and fifth steps to transfer toner images of respective colors, and a step of retransferring the toner images collectively onto a recording sheet which is a recording medium at a predetermined timing to make a record of multi-color image.

FIG. 1 shows a sectional view of a conventional color laser beam printer. In FIG. 1, C denotes a mechanical unit of the color laser beam printer. Numeral 1 denotes a photo-conductor drum, numeral 4 denotes a charger, numeral 5 denotes a semiconductor laser, numeral 6 denotes a scanner motor, numeral 7 denotes a polygon mirror rotated by the scanner motor 6, numeral 8 denotes a lens and numeral 9 denotes a mirror. A light beam L which is on/off modulated by an image signal S 110 (hereinafter referred to as a VDO signal) is outputted from the semiconductor laser 5. The light beam L emitted from the semiconductor laser 5 is deflected by the polygon mirror 7, passes through the lens 8 and the mirror 9 and is directed to the photo-conductor drum 1.

Numeral 12M denotes a developing unit for developing a latent image by magenta color toner (M toner) in the first step. Numeral 12C denotes a developing unit for developing the latent image by cyan color toner (C toner) in the second step. Numeral 12Y denotes a developing unit for developing the latent image by yellow color toner (Y toner) in the third step. Numeral 12BK denotes a developing unit for developing the latent image by black color toner (BK toner). Numerals 20 and 21 denote sheet cassettes for containing record sheets P which are fed one by one by a sheet feed roller 14 or 15 of the sheet cassette selected by an image control unit to be described later.

Numeral 16 denotes a transfer drum which comprises a support 17 and a film 18. Numeral 10 denotes a cleaner for scraping off the toner image which is left undeveloped on the photo-conductor drum 1 at each completion of the transfer process. Numeral 13 denotes a fixing unit and numeral 19 denotes a sheet elect tray. Numeral 11 denotes a charger. Numeral 2 denotes a shield plate for providing a reference to a print timing on the transfer drum 16. Numeral 3 denotes a photo-interrupter. In order for the shield plate to block a light path of the photo-interrupter 3, a reference signal (hereinafter referred to as a TOP signal) is sent from the photo-interrupter 3 to an engine control unit 60 and an image processing unit 50 (see FIG. 2) to be described later for each revolution of the transfer drum 16, and a print start signal and a reference signal to a print operation are generated based on the TOP signal.

An operation of the printer of FIG. 1 is explained. First, the photo-conductor drum 1 is charged to a predetermined polarity and a predetermined voltage by the charger 4 and a photo-conductor drum 1 is scanned by the light beam L modulated by the VDO signal S110 to form a first electrostatic latent image. Then, the first electrostatic latent image is developed by the developing unit 12M to form a first toner image of the magenta color on the photo-conductor drum 1.

On the other hand, a predetermined bias voltage of the opposite polarity to that of the toner is applied to the transfer drum 16 and the first toner image is transferred to the film 18 on the transfer drum 16.

A second electrostatic latent image is then formed on the photo-sensitive drum 1 by the light beam L and it is developed by the developing unit 12C to form a second toner image of the cyan color on the photo-conductor drum 1. The second toner image is transferred to the transfer drum 16 at the position to which the first toner image was transferred.

Similarly, third and fourth electrostatic latent images are formed on the photo-conductor drum 1 and they are developed by the developing units 12Y and 12BK, respectively, to transfer the toner images of the yellow color and the black color to the film 18 on the transfer drum 16. The record sheet P is fed at a predetermined timing so that the toner images of four colors are collectively transferred to the film 18 on the transfer drum 16 and the toner images of four colors are formed on the record sheet P. In this manner, one page of VDO signal S110 is sequentially outputted to the semiconductor laser 5 for each process.

Then, the charger which separates the record sheet P having the four-color toner image transferred thereon from the transfer drum 16 discharges the stored charges on the record sheet P to reduce in-the-air discharge in the retransfer/separation.

FIG. 2 shows a configuration of a print system comprising the color printer described above and a single host computer. Numeral 100 denotes a host computer which generates print information and sends the print information to the printer through a host interface S1. Numeral 50 denotes an image processing unit of the printer which is arranged in a printer mechanism C to store dot data sent from the host computer 100 to a memory to be described later or monitors and controls a print command to a mechanism control unit 60 to be described later. Numeral 60 denotes the mechanism control unit which controls a control module, not shown, necessary for the print operation in the printer mechanism C and supplies the VDO signal to the semiconductor laser 5.

FIG. 3 shows a configuration of the image processing unit 50. Numeral 51 denotes a host interface control unit for controlling an interface with the host computer 100, numeral 52 denotes a CPU (central processing unit) which as a control center of the image processing unit, numeral 53 denotes a memory for a working area of the CPU 52 and holding the four-color dot data, numeral 54 denotes an engine interface unit for exchanging data with the mechanism control unit 60 and numeral 55 denotes a signal generator for generating a reference signal for a second page in two-sheet simultaneous printing.

A control operation of the image processing unit 50 is now explained. One page of dot data inputted from the host interface S1 is temporarily stored in the memory 53 by the control of the CPU 52. When one page of dot data is stored in the memory, the CPU 52 commands the start of the print operation to the mechanism control unit 60 through the engine interface unit 54. In response to the command, the mechanism control unit 60 starts the print operation and sends the TPO signal from the photo-interrupter 3 to the image processing unit 50 as a print start timing signal and further sends a horizontal synchronization signal, not shown, to the image processing unit 50 for each predetermined timing. Each time the image processing unit 50 receives the horizontal synchronization signal through the engine interface 54, it sequentially sends the dot data stored in the memory 53 to the mechanism control unit 60 through the engine interface unit 54.

FIG. 4 shows a timing chart of a send timing of the dot data sent from the image processing unit 50. Particularly, FIG. 4 illustrates the printing on the print sheet P having a sheet length along the feed direction of the record sheet P is substantially equal to the circumference of the transfer drum 16.

In FIG. 4, T1 and T2 denotes first and second print periods, respectively, Q denote a period between the print periods T1 and T2, B denotes a sheet feed operation period for one of the two cassettes shown in FIG. 1 and T4 denotes a period from the start of TOP signal in the fourth step to the start of sheet feed for transferring the toner images of the first and second pages on the transfer drum 16 to the record sheet. The printing of the first page data is made during the period T1, and the development of the second page dot data is made during the period T2.

In the prior art, since only one sheet of toner image is transferred during the transfer process by one revolution of the transfer drum 16, a long time is required when the same image is to be printed on a plurality of sheets.

Further, when different dot data is to be printed for each page, the printing is stopped each time to exchange and store the dot data. Accordingly, the waiting time Q is long as shown in FIG. 4. Particularly, as shown in FIG. 8, when a plurality of host computers 100a, 100b, 100c, 100e and 100f are connected to the host interface, the waiting time is longer than the waiting time for connecting the single host computer shown in FIG. 2. Recently, as the network is advanced, the connection configuration as shown in FIG. 8 is increasing.

In order to solve the increase of the waiting time, a second memory may be added to the image processing unit 50 so that the dot data is stored in the second memory while the dot data in the first memory 53 is sent to the mechanism control unit 60. However, such addition of the memory is very expensive and a time corresponding to approximately one revolution of the transfer drum is required before the mechanism control unit 60 is started up once it is stopped. Thus, the waiting time increases.

SUMMARY OF THE INVENTION

It is an object of the present invention to provide image forming apparatus and image forming method which eliminate the above defects.

It is another object of the present invention to provide image processing apparatus and image processing method which do not require the addition of the memory and thus suppress the cost increase and yet reduce the waiting time to the completion of the printing.

It is other object of the present invention to provide image forming apparatus and image forming method which reduce a time required for multi-sheet printing.

It is other object of the present invention to provide image forming apparatus and image forming method which print a plurality of different images concurrently to reduce a time required for printing.

Other objects of the present invention will be apparent from the following description and the accompanying drawings.

BRIEF DESCRIPTION OF THE DRAWINGS

FIGS. 6A–6D show a time chart of a send timing of dot data sent from an image processing unit when print data for a sheet length of less than one half of a circumference of a transfer drum is to be printed on toe sheets concurrently in accordance with a first embodiment of the present invention, FIG. 7 shows a flow chart of a control operation of the image processing unit in the first embodiment of the present invention, FIGS. 9A–9D show a timing chart of a send timing of dot data sent from the image processing unit when sheet sizes are different from each other in a second embodiment of the present invention, FIGS. 10A–10D a timing chart of a send timing of dot data sent from the image processing unit when sheet sizes are different from each other and different print data are printed on two sheets concurrently in a third embodiment of the present invention.

DETAILED DESCRIPTION OF THE PREFERRED EMBODIMENTS

Figure 1:
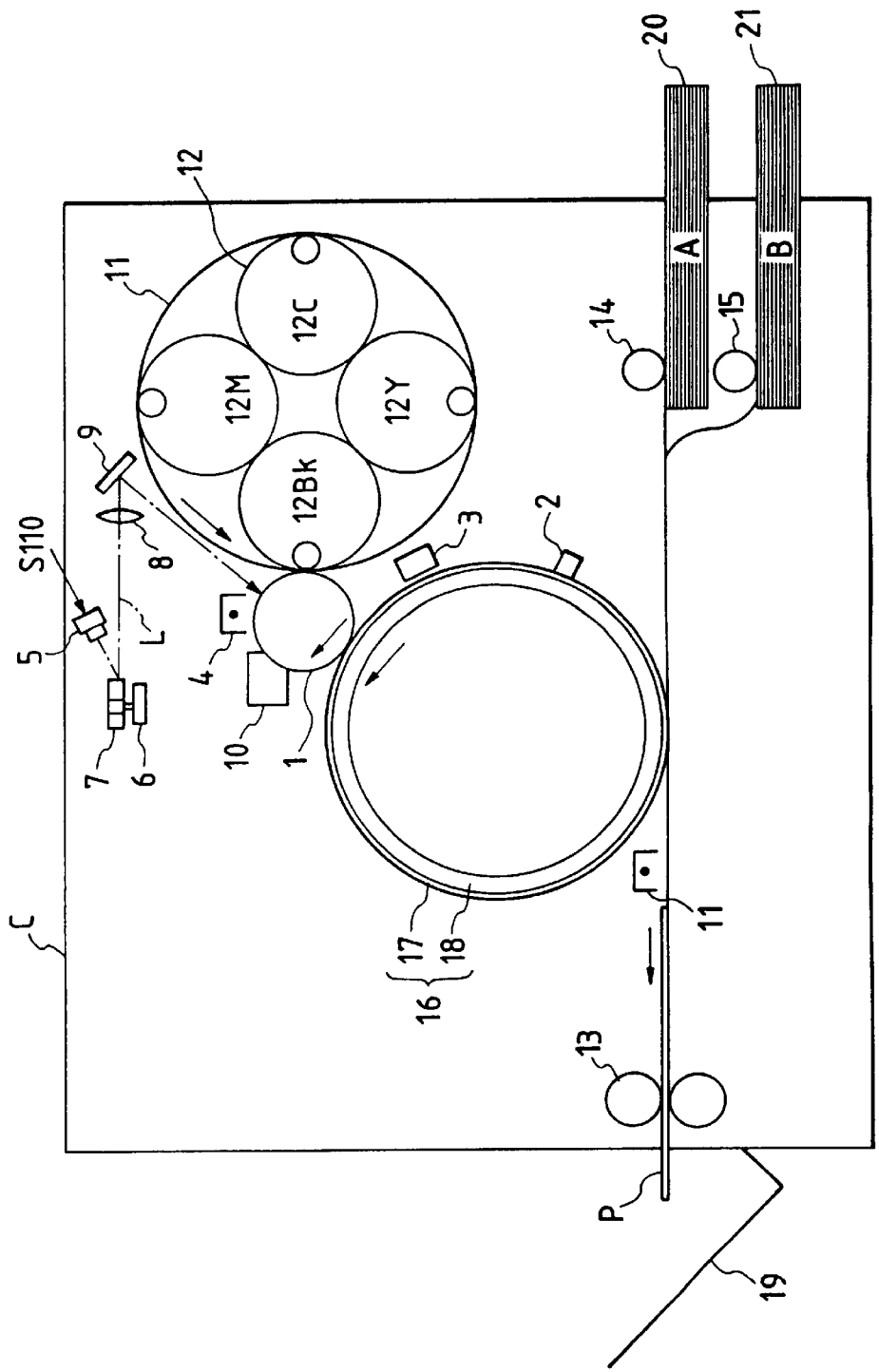
FIG. 1 shows a sectional view of a conventional color laser beam printer.

The embodiments of the present invention are now explained with reference to the drawings.

[First Embodiment]

A first embodiment of the present invention is described. A configuration and a circuit of the present embodiment are similar to those of the prior art shown in FIGS. 1, 2 and 3 and the same drawings are used with the same reference numerals and the duplicate explanation is omitted.

Figure 3:
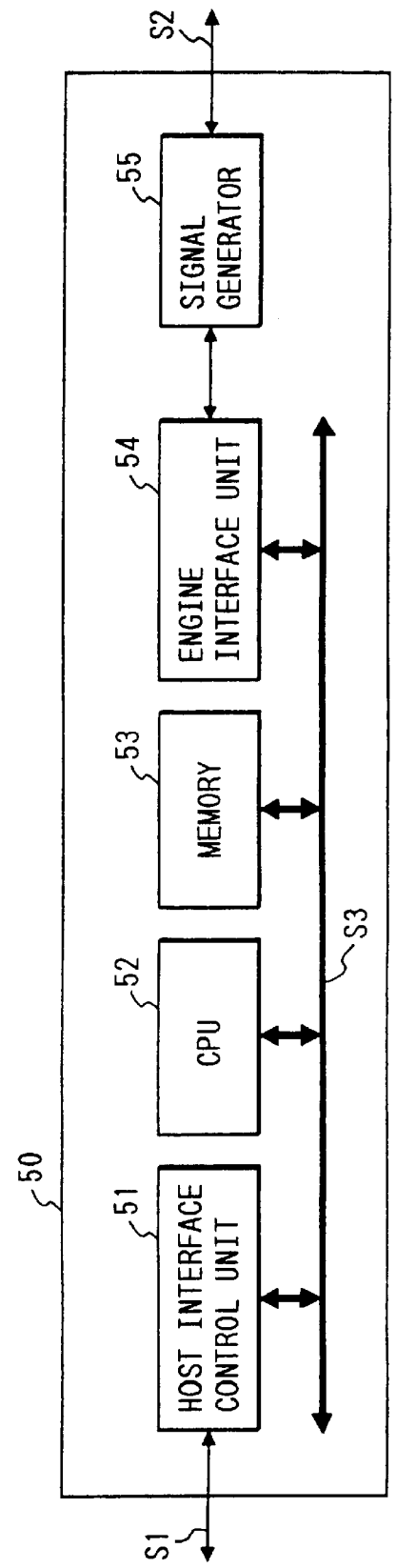
FIG. 3 shows a block diagram of a configuration of an image processing unit of FIG. 2.
Figure 5A:
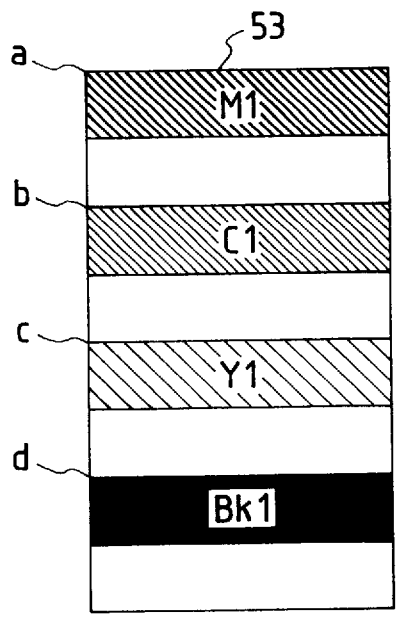
FIGS. 5A and 5B show a memory map of the arrangement of the dot data developed in a memory of the image processing unit.
Figure 5B:
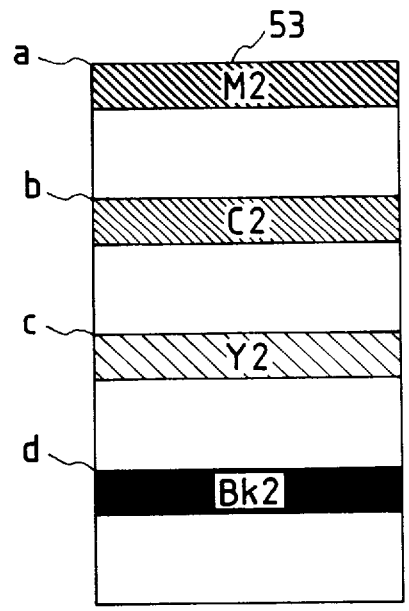

FIGS. 5A and 5B show the arrangement of dot data developed in the memory 53 of the image control unit 50 of FIG. 3, and a, b, c and d denote start address of the dot data of magenta (M), cyan (C), yellow (Y) and black (BK). M1, C1, Y1, BK1, M2, C2, Y2 and BK2 correspond to dot data of the identical symbols shown in FIGS. 6A–6D to be explained later. FIG. 5A shows the arrangement of first page of data when it is stored, and FIG. 5B shows the arrangement of second page of dot data when it is stored.

Figure 4:
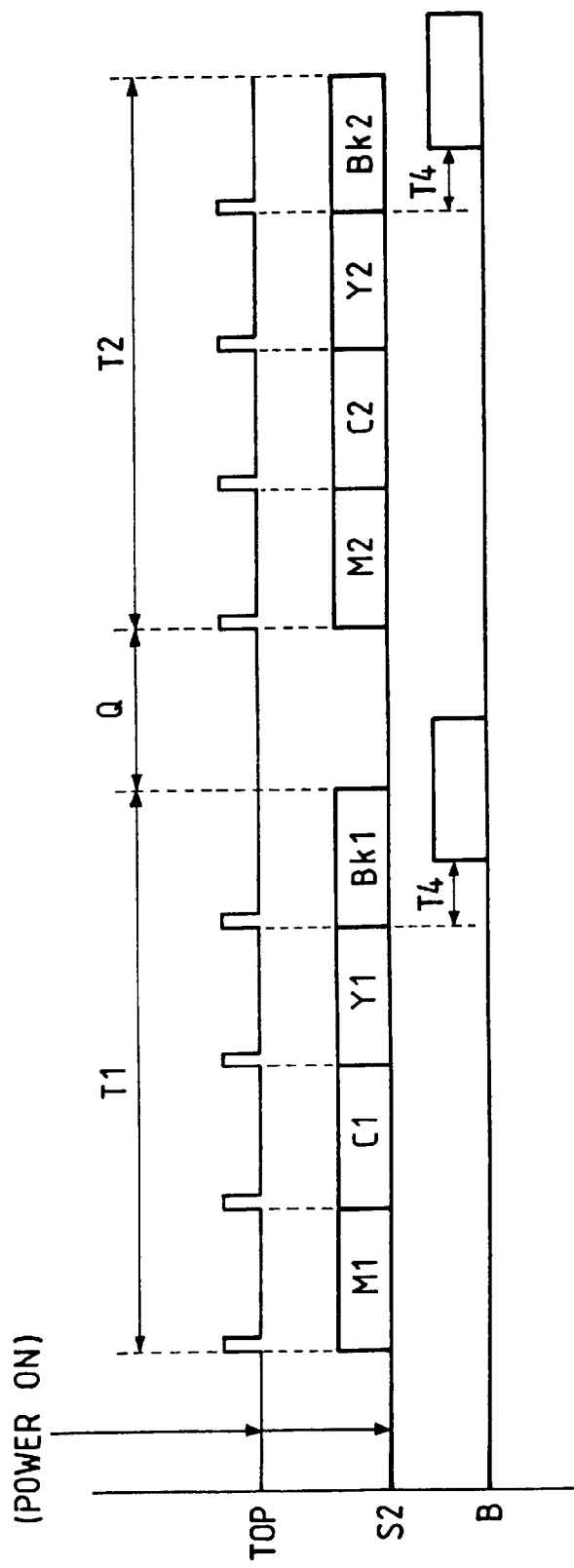
FIG. 4 shows a timing chart of a send timing of dot data sent from the image processing unit when printing is made on a record sheet in the prior art.

In FIGS. 6A–6D, T1, T2, T4 and Q are identical to those of FIG. 4 and the explanation thereof is omitted. T5 denotes a period to start the sheet feed for transferring the first page, the second sheet toner image on the record sheet. A difference from FIG. 4 is that the sheet length along the sheet feed direction is less than one half of the circumference of the transfer drum and hence the same dot data is set twice to the mechanism control unit 60 during one revolution of the transfer drum to print on two sheets in one process in order to improve a print efficiency. For the send timing of the dot data for the second sheet, a command is set from the signal generator 55 of FIG. 3 to the engine interface unit 54.

FIG. 7 shows a flow chart of a control operation of the image processing unit 50. The control operation of the prior art image control unit 50 is explained in detail with reference to the flow chart.

First, dot data inputted through the host interface unit 51 is stored in the memory 53 (step 100), and then whether the entire first page data has been stored in the memory 53 or not is determined (step 101). If it has been stored, the process proceeds to a next step 102, and if it has not been stored, the storing step 100 is continued.

In the next step 102, if a command from the host computer 100 is not multiple copy, a command of intermittent print is issued to the mechanism control unit 60 (step 106), and if it is the multiple print command, whether the sheet length along the sheet feed direction commanded by the host computer is less than one half (L1) of the circumference of the transfer drum or not is determined (step 103), and if it is not less then L1, the printing of designated number of sheets by one-by-one printing is commanded to the mechanism control unit 60 (step 105), and if it is less than L1, the printing of the number of sheets designated by the host computer in the two-sheet concurrent printing mode is commanded to the mechanism control unit 60 (step 104).

The host computer 100 controls the send timing of the print data depending on whether one-by-one printing mode or two-sheet concurrent printing mode is commanded.

[Second Embodiment]

A second embodiment of the present invention is now explained.

In the first embodiment, when multiple page data is to be printed on a plurality of sheets, the print operation is temporarily stopped to receive the second page dot data, and after the completion of the storing of the second page dot data into the memory 53, the second page is printed. As a result, the waiting time Q is required.

The second embodiment intends to shorten the print time.

FIGS. 9A–9D show a timing chart of the send timing of the dot data sent from the image processing unit 50 (see FIG. 2) in the second embodiment of the present invention, in which the sheet lengths along the sheet feed direction of the first page and the second page are different from each other and the printing is made on the print sheet P when a total length of the sheet lengths of the first page and the second page is less than the circumference of the transfer drum 16.

Figure 2:
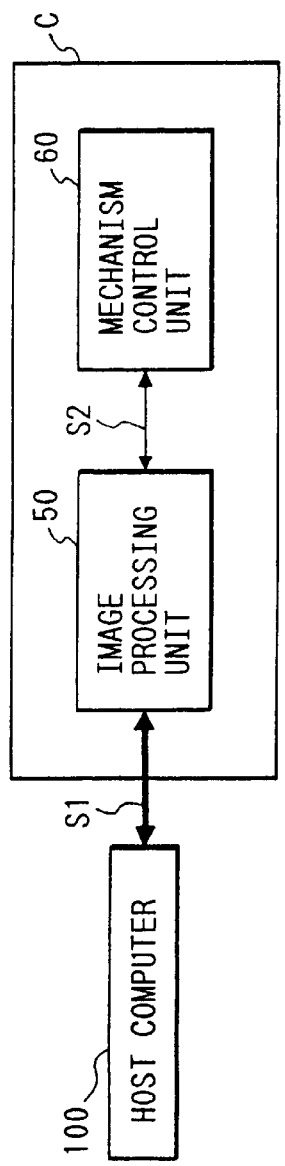
FIG. 2 shows a block diagram of a configuration of a print system for receiving print image information from a single host computer.

In FIGS. 9A–9D, T1 and T2 denote print periods for the first page and the second page, respectively, A denotes a sheet feed operation period of the first cassette 20 shown in FIG. 1, B denotes a sheet feed operation time of the second cassette 21 shown in FIG. 1, T4 denotes a period from the start of the TOP signal in the fourth step to the start of the sheet feed of the first cassette 20 for transferring the first page toner image, and T6 denotes a period from the start of the TOP signal in the fourth step to the start of the sheet feed of the second cassette 21 for transferring the second page toner image. Since the printing on the different sheet sizes is made in one step, the printing on the two types of record sheets is attained without requiring the waiting time Q which is required in the prior art and the first embodiment.

Figure 11A:
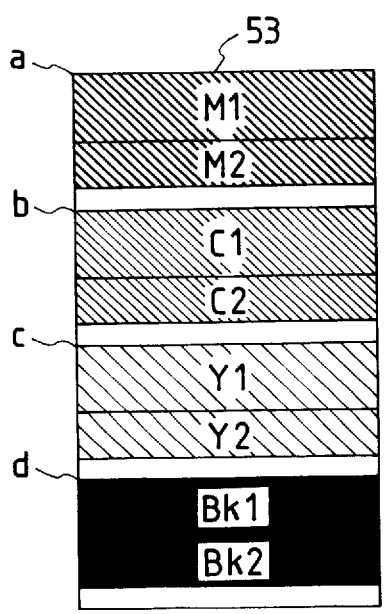
FIGS. 11A and 11B show memory maps of the arrangement of the dot data developed in the memory of the image processing unit in the second embodiment and the third embodiment, respectively.

FIG. 11A shows the arrangement of dot data developed in the memory 53 (see FIG. 3) to hold the dot data of the image control unit 50 corresponding to those in an effective record range of the transfer drum, in which a, b, c and d denote start addresses of magenta (M), cyan (C), yellow (Y) and black (BK) dot data. M1, C1, Y1, BK1, M2, C2, Y2 and BK2 correspond to the dot data of the identical symbols in FIG. 9. In the present embodiment, since the first page dot data (M1, C1, Y1, BK1) and the second page dot data (M2, C2, Y2, BK2) are arranged side by side as shown in FIG. 11A, the memory utilization efficiency is enhanced compared with the first embodiment of FIGS. 5A and 5B.

Figure 12:
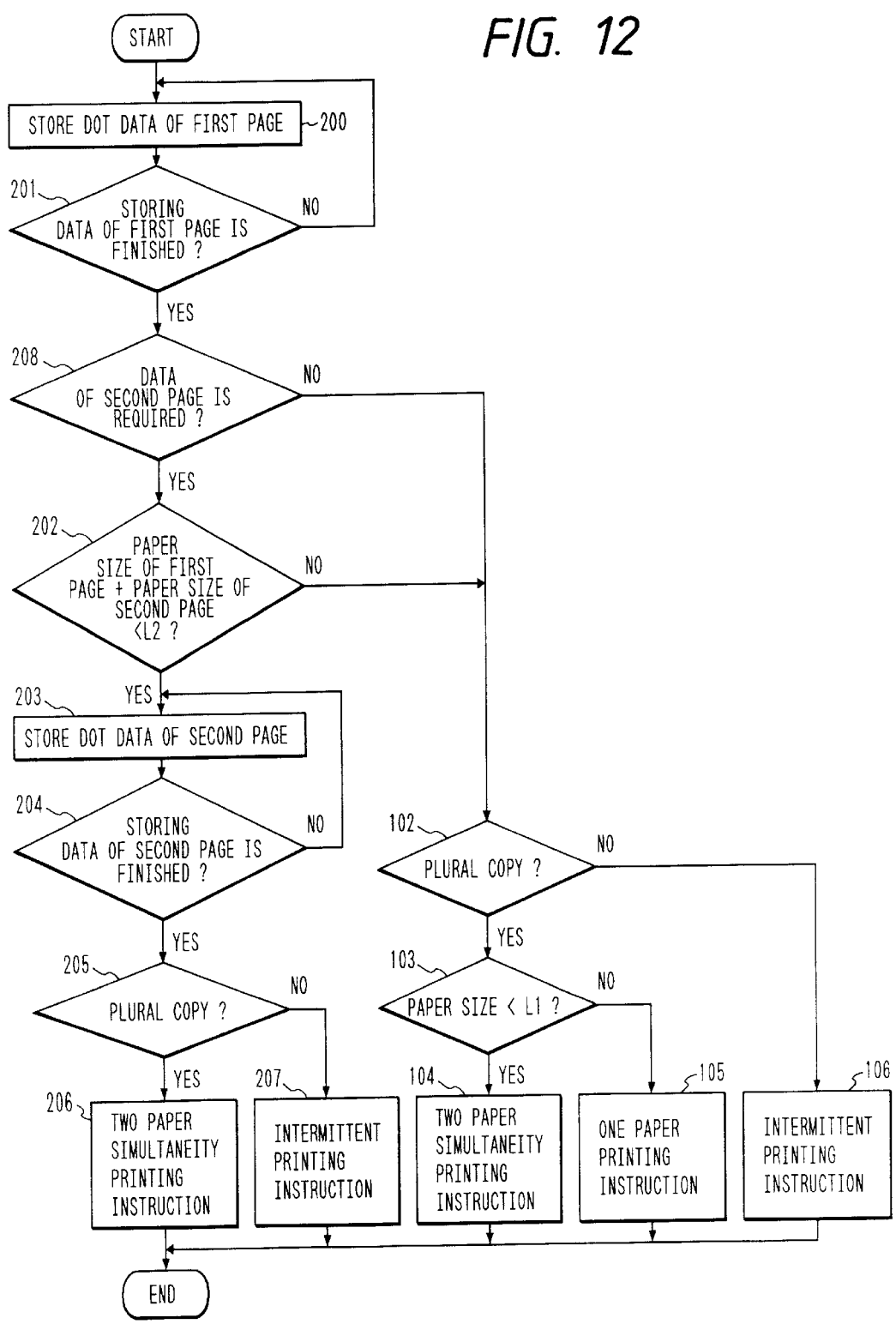
FIG. 12 shows flow chart of a control operation of the image processing unit in the second embodiment of the present invention.

FIG. 12 shows a flow chart of a control operation of the image processing unit 50 of the present embodiment. The operation of the second embodiment is explained in detail with reference to the flow chart.

First, the dot data inputted through the host interface unit 51 (see FIG. 3) is stored in the memory 53 (step 200) and then whether the entire first page data has been stored in the memory 53 or not is determined (step 201). If it has been stored, the process proceeds to a next step 208, and if it has not been stored, the process continues the storing step 200.

In the step 208, if a subsequent print request is issued from the host computer 100 within a predetermined time interval and if a sum of sheet length of the first page sheet along the sheet feed direction and the sheet length of the second page sheet along the sheet feed direction is less than the circumference length L2 of the transfer drum 16 (step 202), the control of steps 203 to 207 which is unique to the present embodiment is conducted.

In the step 208, if the subsequent print command is not issued from the host computer 100 within the predetermined time interval or if the sum of the sheet sizes of the first page and the second page along the sheet feed direction is not less than the circumference length L2 of the transfer drum 16, the same control as that in the steps 102 to 106 of the first embodiment explained in FIG. 7 is conducted.

The steps 203 to 207 are now explained. If the sum of the sheet size of the first page along the sheet feed direction and the sheet size of the second page along the sheet feed direction is less than the circumference length L2 of the transfer drum 16 (step 202), the second page dot data is stored in the memory 53 (step 203) and then whether the entire second page data has been stored in the memory 53 or not is determined (step 204), and if it has been stored, the process proceeds to a next step 205, and if it has not been stored, the storing step 203 is continued. In the step 205, if the command from the host computer 100 is not the multiple sheet copy, the intermittent printing is commanded to the mechanism control unit 60 (step 207), and if the command from the host computer 100 is the multiple sheet copy, the printing of the designated number of sheets by the two-sheet concurrent printing of different sheet sizes is commanded to the mechanism control unit 60 (step 206).

[Third Embodiment]

A third embodiment of the present invention is now explained.

FIGS. 10A–10D a timing chart of a send timing of dot data sent from the image processing unit 50 in the present embodiment, in which the sheet lengths of the first page and the second page along the sheet feed direction are same and the sum of the sheet lengths of the first page and the second page is less than the circumference of the transfer drum 16.

In FIGS. 10A–10D, T1 and T2 denote print periods of the first page and the second page, respectively, A denotes the sheet feed operation period of the first cassette 20 shown in FIG. 1, T4 denotes the period from the start of the TOP signal in the fourth step to the start of the sheet feed of the first cassette 20 for retransferring the toner image of the first page to the record sheet and T7 denotes the period from the start of the TOP signal of the fourth step to the start of the sheet feed of the first cassette 20 for retransferring the toner image of the second page to the record sheet. Since the printing of the same print data on the different sheet sizes is conducted in one process, the waiting time Q required in the prior art is not required and the printing to the records sheet P is attained efficiently.

Figure 11B:
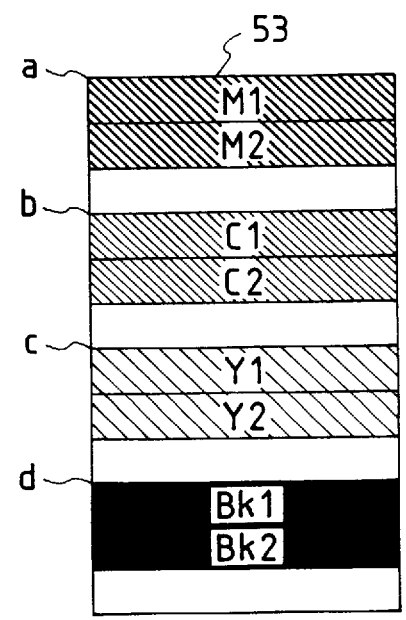
Figure 8:
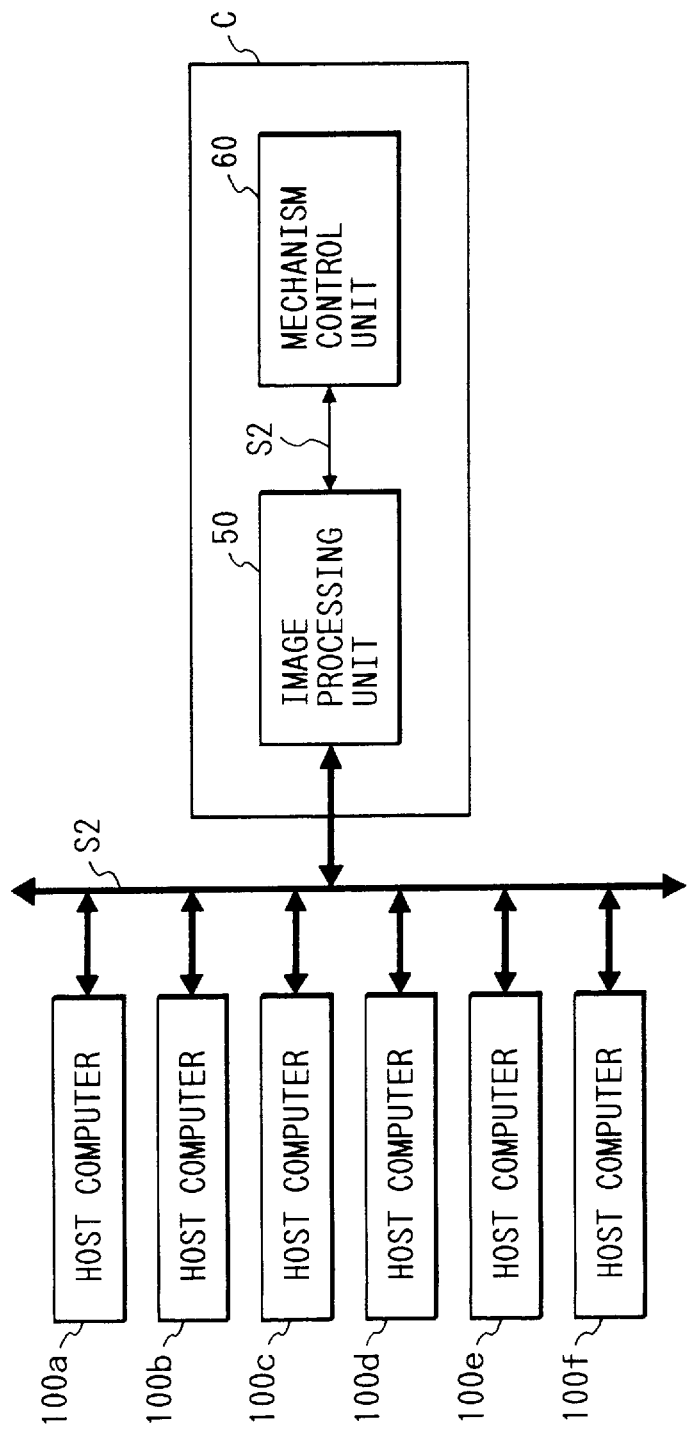
FIG. 8 shows a block diagram of a configuration of a print system for receiving print image information from a plurality of host computers.

FIG. 11B shows the arrangement of the dot data developed in the memory 53 (see FIG. 3) of the image control unit 50, in which a, b, c and d denote start addresses of the dot data of magenta (M), cyan (C), yellow (Y) and black (BK), respectively. M1, C1, Y1, BK1, M2, C2, Y2 and BK2 correspond to the dot data of the identical symbol in FIG. 10. In the present embodiment, since the first page dot data (M1, C1, Y1, BK1) and the second page dot data (M2, C2, Y2, BK2) are arranged side by side as shown in FIG. 11B, the memory utilization efficiency is improved over the first embodiment of FIGS. 5A and 5B.

The present invention is not limited to the color laser beam printer but it is equally applicable to other types of page printers such as an LED printer using a transfer drum.

The present invention attains the following effects:

(1) Since the two-sheet concurrent printing is conducted not only for the multiple sheet copy of the same print data but also for the printing to different sheet sizes or different print data, the waiting time before the completion of the printing is reduced and the efficient printing is attained.

(2) Since the first page dot data and the second page dot data are stored in the memory with the side by side arrangement, the memory utilization efficiency is improved and a large size memory is not required and the waiting time is reduced without cost increase.

What is claimed is:

1. An image forming apparatus comprising:

input means for inputting an image signal;

a memory for storing the image signal inputted by said input means;

latent image forming means for forming a latent image on a photo-conductor on the basis of the image signal stored in said memory;

a plurality of developing means for developing the latent image formed by said latent image forming means by color toners which differ from each other;

a transfer member to which each of the different color toner images developed by said plurality of developing means is transferred repeatedly;

transfer means for transferring the different color toner images transferred to said transfer member from said transfer member to a record sheet after the different color toner images are transferred to said transfer member; and control means for causing said memory to store an image signal of a first page and an image signal of a second page an image size of which is different from an image size of the first page inputted by said input means when a sum of each length of latent images to be formed on the basis of the image signals of the first page and the second page is less than a length of a transfer area of said transfer member and controlling said memory, said latent image forming means and said developing means such that the toner images of the first page and the second page are concurrently transferred to said transfer member.

2. An image forming apparatus according to claim 1, wherein said transfer means transfers the toner images of the first page and the second page transferred to said transfer member to different record sheets.

3. An image forming apparatus according to claim 1, wherein said control means repeats the sequential reading of the image signals of the first page and the second page stored in said memory to transfer the toner images of the first page and the second page to the record sheet by multiple sets.

4. An image forming apparatus according to claim 1, wherein said input means sequentially inputs image signals of a plurality of color components, and wherein said memory stores the image signals of the plurality of color components.

5. An image forming apparatus comprising:

input means for inputting image signals of different color components;

image forming means for forming different color visible images by forming latent images on a photo-conductor on the basis of the image signals inputted by said input means and developing the latent images by different color developing agents;

a transfer member to which each of the visible images formed by said developing means is transferred repeatedly;

transfer means for transferring the visible images transferred to said transfer member from said transfer member to a record sheet after the visible images are transferred to said transfer member;

determination means for determining, when the image signal of a second page is inputted sequentially after the image signal of a first page an image size of which is different from an image size of the second page is inputted by said input means, whether a sum of an image length of the first page and an image length of the second page is less than a length of a transfer area of said transfer member or not; and control means for determining the number of images to be transferred to the transfer area of said transfer member on the basis of a determination result by said determination means and controlling said image forming means.

6. An image forming apparatus according to claim 5, wherein when said determination means determines that the sum of the image lengths of the first page and the second page is less than the length of the transfer area, said control means causes the visible images of the first page and the second page to be transferred concurrently to said transfer member, and when said determination means determines that the sum of the image lengths of the first page and the second page is longer than the length of the transfer area, said control means causes the visible image of the first page to be transferred to said transfer member without causing the visible image of the second page to be transferred.

7. An image forming apparatus according to claim 5, further comprising a memory for storing the image signals inputted by said input means, wherein when said determination means determines that the sum of the image lengths of the first page and the second page is less than the length of the transfer area, said memory stores the image signals of the first page and the second page, and when said determination means determines that the sum of the image lengths of the first page and the second page is larger than the length of the transfer area, said memory does not store the image signal of the second page.

8. An image forming apparatus according to claim 5, wherein said input means sequentially inputs image signals of a plurality of color components, the visible images of the plurality of color components sequentially formed by said image forming means are transferred to said transfer member, and said transfer means transfers the visible images of the plurality of color components on said transfer member to the record sheet.

9. An image forming apparatus comprising:
input means for inputting image signals of a plurality of color components and a size of images based on the image signals;
image forming means for forming a latent image on a photo-conductor on the basis of the input image signal, developing the latent image by a developing agent and transferring the developed image to a transfer member, and overlaying the developed images on the transfer member by repeating those steps for each of the color components to form a color image;
transfer means for transferring the color image formed on said transfer member by said image forming means from said transfer member to a record sheet after the developed images are overlaid;
determination means for determining whether a sum of an image size of a first page and an image size of a second page different from the image size of the first page inputted by said input means is less than a predetermined size or not; and
controlling means for determining whether the developed images of the first page and the second page are to be transferred to said transfer member in one process or the developed image of only the first page is to be transferred in accordance with a determination result made by said determination means and controlling said image forming means.

10. An image forming apparatus according to claim 9 further comprising a memory for storing the image signals of the plurality of color components inputted by said input means, wherein when said determination means determines that the sum of the image sizes of the first page and the second page is less than the predetermined size, said memory stores the image signals of the first page and the second page, and when said determination means determines that the sum of the image sizes of the first page and the second page is larger than the predetermined size, said memory does not store the image signal of the second page.

11. An image forming method which is used in an image forming apparatus comprising:
input means for inputting image signals of different color components; and
image forming means for forming latent images on a photo-conductor on the basis of the image signals inputted by said input means, forming different color visible images by developing the latent images by different color developing agents, transferring the visible images to a transfer member repeatedly, and transferring the visible images transferred to said transfer member from said transfer member to a recording sheet, comprising the steps of:
inputting an image signal of a first page and an image size of the first page;
inputting an image size of a second page different from the image size of the first page;
determining whether a sum of the image sizes of the first page and the second page is less than a size of a transfer area of said transfer member or not; and
determining the number of images to be transferred to the transfer area of said transfer member in accordance with a determination result in said determining step.

12. An image forming method which is used in an image forming apparatus comprising:
input means for inputting image signals of a plurality of color components and a size of images based on the image signals;
image forming means for forming a latent image on a photo-conductor on the basis of the input image signal, developing the latent image by a developing agent, transferring the developed image to a transfer member, and overlaying developed images on the transfer member by repeating those steps for each of the color components to form a color image; and
transfer means for transferring the color image formed on said transfer member by said image forming means from said transfer member to a record sheet after the developed images are overlaid, comprising the steps of:
determining whether a sum of an image size of a first page and an image size of a second page different from the image size of the first page inputted by said input means is less than a predetermined size or not; and
determining, in accordance with a determination in said determining step, whether developed images of the first page and the second page are to be transferred to said transfer member in one process or the developed image of only the first page is to be transferred.

13. An image forming method which is used in an image forming apparatus comprising:
input means for inputting image signals of a plurality of color components and a size of images based on the image signals;
image forming means for forming a latent image on a photo-conductor on the basis of the input image signal, developing the latent image by a developing agent and transferring the developed image to a transfer member, and repeating those steps of each of the color components to form a color image; and
transfer means for transferring the color image formed on said transfer member by said image forming means from said transfer member to a record sheet, comprising the steps of:
determining whether a sum of an image size of a first page and an image size of a second page different from the image size of the first page inputted by said input means is less than a predetermined size or not; and
determining, in accordance with a determination in said determining step, whether developed images of the first page and the second page are to be transferred to said transfer member in one process or the developed image of only the first page is to be transferred.

* * * * *

UNITED STATES PATENT AND TRADEMARK OFFICE
CERTIFICATE OF CORRECTION

PATENT NO. : 5,870,648
DATED : February 9, 1999
INVENTOR(S) : Eihiro SAKAKI, et al.

It is certified that error appears in the above-identified patent and that said Letters Patent is hereby corrected as shown below:

COLUMN 3:

```
Line 18, "denotes" should read --denote--;
Line 19, "denote" should read --denotes--;
Line 63, "other" should read --another--; and
Line 66, "other" should read --another--.
```

COLUMN 4:

```
Line 22, "time" should read --timing--; and
Line 66, "address" should read --addresses--.
```

COLUMN 7:

```
Line 1, "10A-10D" should read --10A-10D show--.
```

COLUMN 9:

```
Line 47, "claim 9" should read --claim 9,--.
```

Signed and Sealed this

Thirty-first Day of August, 1999

Attest:

Q. TODD DICKINSON

*Attesting Officer*   *Acting Commissioner of Patents and Trademarks*